(12) United States Patent
Kireev et al.

(10) Patent No.: US 8,436,642 B1
(45) Date of Patent: May 7, 2013

(54) CONTROL OF TERMINATION CAPACITANCE FOR MAXIMUM TRANSMITTER BANDWIDTH EXTENSION

(75) Inventors: Vassili Kireev, Sunnyvale, CA (US); Toan D. Tran, San Jose, CA (US)

(73) Assignee: XIlinx, Inc., San Jose, CA (US)

( * ) Notice: Subject to any disclaimer, the term of this patent is extended or adjusted under 35 U.S.C. 154(b) by 0 days.

(21) Appl. No.: 13/216,093

(22) Filed: Aug. 23, 2011

(51) Int. Cl.
*H03K 17/16* (2006.01)

(52) U.S. Cl.
USPC ............. 326/30; 326/38; 326/86; 327/108

(58) Field of Classification Search ........... 326/21–30, 326/86; 327/108–112, 170
See application file for complete search history.

(56) References Cited

U.S. PATENT DOCUMENTS

| | | | |
|---|---|---|---|
| 6,147,551 A * | 11/2000 | Hong | 327/554 |
| 6,326,821 B1 * | 12/2001 | Gabara | 327/112 |
| 6,388,500 B1 * | 5/2002 | Lee et al. | 327/337 |
| 6,906,567 B2 * | 6/2005 | Culler | 327/170 |
| 6,995,583 B2 * | 2/2006 | Culler | 326/27 |
| 7,508,232 B2 * | 3/2009 | Lee et al. | 326/30 |
| 7,576,664 B2 * | 8/2009 | Lee | 341/55 |
| 7,718,307 B2 * | 5/2010 | Shimizu et al. | 429/61 |
| 7,821,289 B2 * | 10/2010 | Lee | 326/27 |
| 7,969,183 B2 * | 6/2011 | Kinoshita et al. | 326/30 |

OTHER PUBLICATIONS

Feucht, D., "Handbook of Analog Circuits Design", Academic Press, Inc. 1990, 8. Wideband Amplification, pp. 334-344.
Xilinx, Inc., "Virtex-5 Racket IO GTP Transceiver User Guide", UG196, (v1.2) Feb. 2, 2007, pp. 1-300 (p. 195), 2100 Logic Drive, San Jose, CA.

* cited by examiner

*Primary Examiner* — Vibol Tan
(74) *Attorney, Agent, or Firm* — Gerald Chan

(57) ABSTRACT

An integrated circuit device includes an input/output (IO) pad, and a programmable termination capacitance circuit coupled to the IO pad, the programmable termination capacitance circuit comprising at least one compensation bank, wherein each of the at least one compensation bank includes a compensation capacitor coupled to a reference voltage through a compensation pass gate.

19 Claims, 6 Drawing Sheets

CONTROL OF TERMINATION CAPACITANCE FOR MAXIMUM TRANSMITTER BANDWIDTH EXTENSION

TECHNICAL FIELD

An embodiment described herein relates to integrated circuit devices (ICs), and in particular, to a method of and circuit for termination.

BACKGROUND

Peaking network techniques have been implemented in integrated circuit devices to extend the bandwidth of high speed inputs/outputs (IOs) to accommodate the ever increasing interconnect signal frequencies. In a peaking network, an inductor is added in series with a termination resistance to extend the frequency response of the IO. The termination resistance is typically implemented with a poly resistor in the integrated circuit device. However, over different manufacturing process, operating voltage, and operating temperature corners, there can be wide variations in the termination resistance due to variations in the poly sheet resistance over these corners.

To counter variations of the termination resistance over process and operating corners and to provide greater flexibility in the DC matching of the IO at the circuit board level, a programmable termination resistance circuit is used. The programmable termination resistance circuit allows the selection of different banks of poly resistors to be coupled together to yield a range of possible resistance depending on how the circuit is programmed. The range of resistance provided by the programmable termination resistance circuit allows each individual integrated circuit device to be custom programmed to provide a more accurate termination resistance. The custom programming depends on the particular operating conditions of that device in a particular design application, and depends on the particular process corner that the device was subjected to during manufacturing. However, while the programmable termination resistance circuit provides a more accurate termination resistance, the different selection of the different banks of poly resistors due to the different custom programming from device to device results in variations of the parasitic capacitance of the programmable termination resistance circuit. Variations in the parasitic capacitance can cause degradation of signal integrity due to undesirable ringing and increase of settling time of a signal.

SUMMARY

In accordance with some embodiments, an integrated circuit device includes an input/output (IO) pad, and a programmable termination capacitance circuit coupled to the IO pad, the programmable termination capacitance circuit comprising at least one compensation bank, wherein each of the at least one compensation bank includes a compensation capacitor coupled to a reference voltage through a compensation pass gate.

In accordance with other embodiments, an integrated circuit device includes an input/output (IO) pad, a programmable termination capacitance circuit coupled between the IO pad and a reference voltage, a programmable termination resistance circuit coupled between the IO pad and the reference voltage, and a control circuit coupled to the programmable termination capacitance circuit through a termination capacitance control bus, and to the programmable termination resistance circuit through a termination resistance control bus.

In accordance with other embodiments, a method of maximizing bandwidth extension for an input/output (IO) pad having a programmable termination resistance circuit, includes providing an inductor coupled in series between the IO pad and the programmable termination resistance circuit to form an inductive peaking network, providing a programmable termination capacitance circuit coupled to the IO pad, programming the programmable termination resistance circuit to have a termination resistance value, and programming the programmable termination capacitance circuit to compensate for a change in a parasitic capacitance caused by programming the programmable termination resistance circuit.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Figure 1:
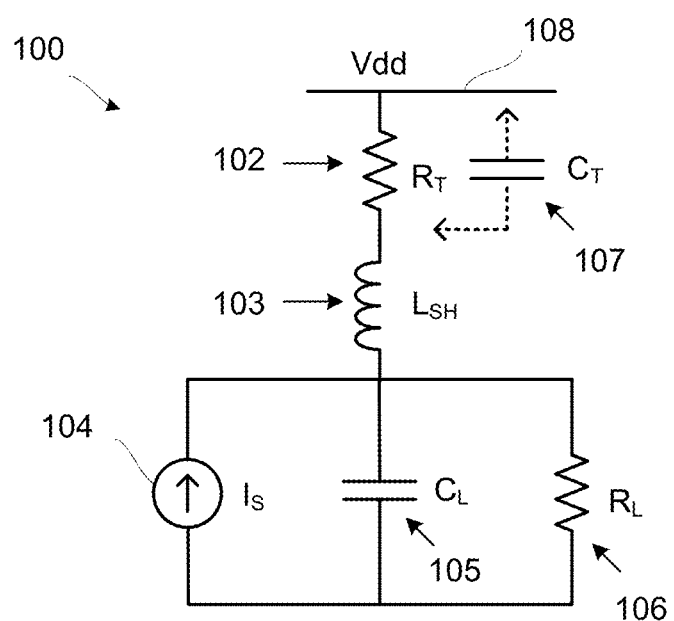
FIG. 1 illustrates an inductive shunt peaking network for a current mode driver.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

FIG. 1 illustrates a conventional circuit 100 with an inductive shunt peaking network for a current mode driver. The conventional circuit 100 includes a current source 104 to drive a load represented by the load capacitance $C_L$ 105 and the load resistance $R_L$ 106. The circuit 100 also has a termination resistance 102 coupled to a termination voltage Vdd 108. The introduction of the shunt inductor $L_{SH}$ 103 in series with the termination resistance $R_T$ 102 forms a resonant circuit to extend the bandwidth of the circuit 100. This type of bandwidth extension is known as shunt inductive peaking. While inductive peaking techniques are known in the art, prior inductive peaking techniques have not taken into account the impact of the termination parasitic capacitance $C_T$ 107 of the termination resistance $R_T$ 102.

Figure 2:
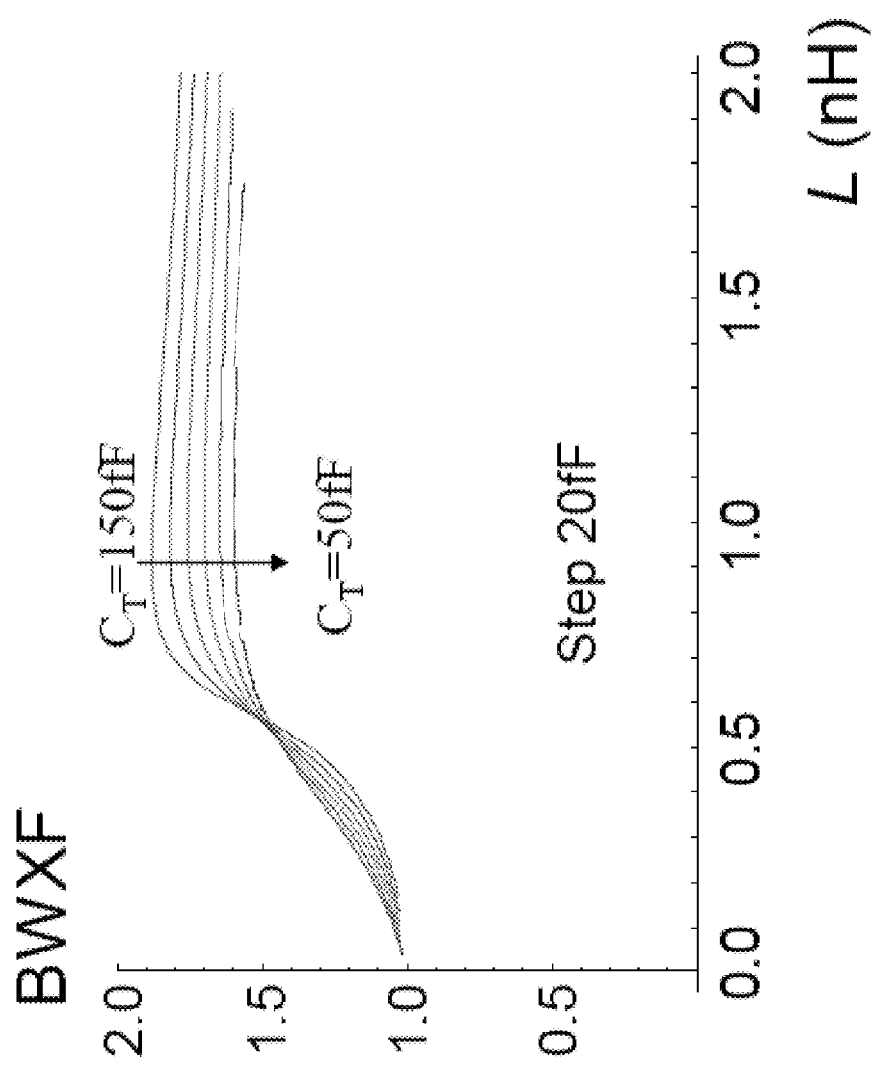
FIG. 2 illustrates the effects of variations in parasitic capacitance on the bandwidth extension factor in the aforementioned inductive peaking network.

FIG. 2 illustrates the impact of the parasitic capacitance $C_T$ 107 on the bandwidth extension factor (BWXF) as a function of the inductance value of the shunt inductor $L_{SH}$ 103. When the termination parasitic capacitance $C_T$ 107 is varied from 150 femto-Farads (fF) down to 50 fF, the maximum BWXF decreases from 1.8 to 1.5. The lower BWXF value resulting from a decrease in the termination parasitic capacitance $C_T$ 107 can be attributed to the lowering of the quality factor of the resonant circuit formed with the introduction of the shunt inductor $L_{SH}$ 103. While this tends to show that it would be desirable to increase the termination parasitic capacitance $C_T$ 107 to yield a higher BWXF, further increases in the termination parasitic capacitance $C_T$ 107 may lead to signal integrity degradation due to a shift in the ringing and degradation of settling time.

Figure 3A:
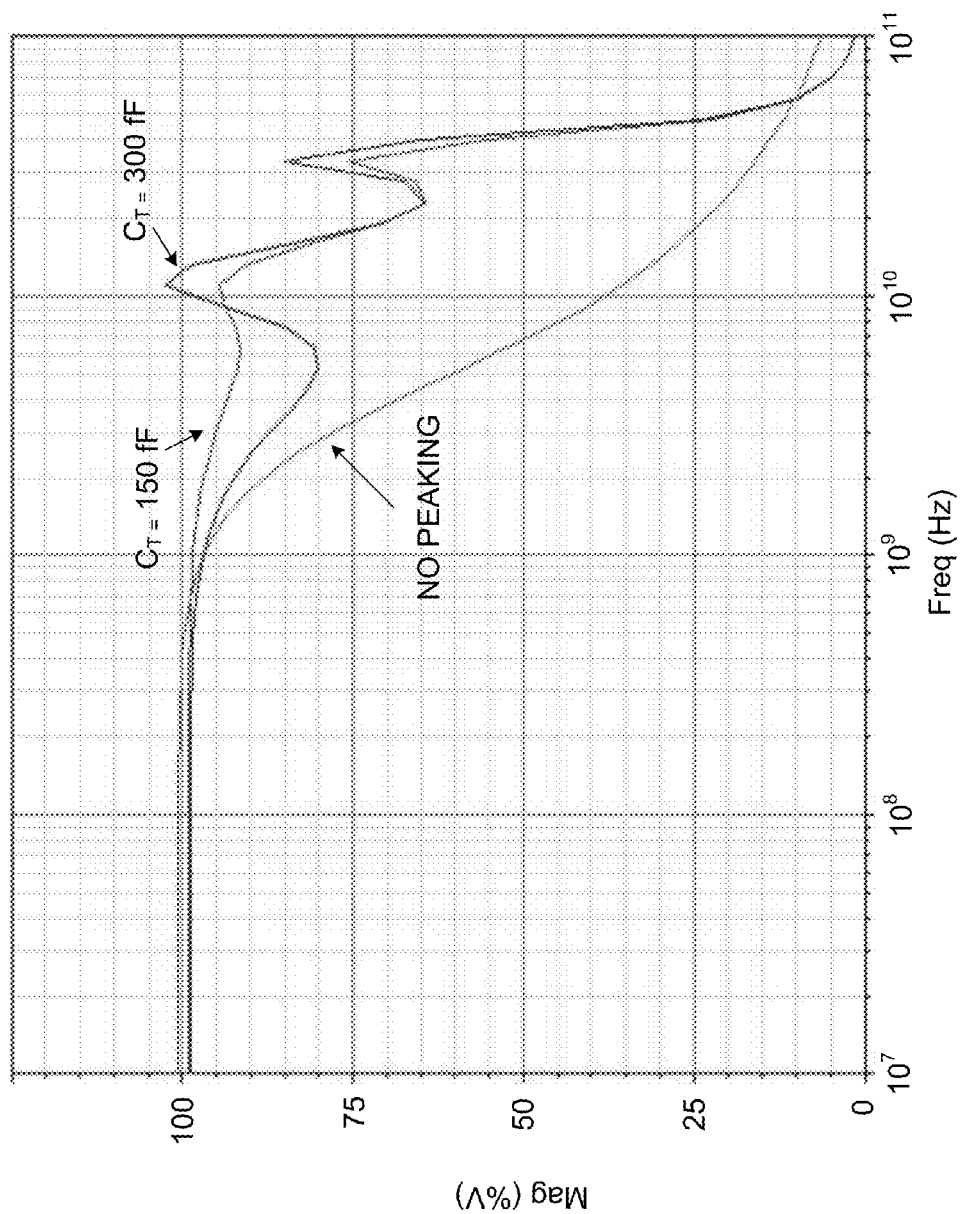
FIG. 3A illustrates the bandwidth comparison of a circuit with an inductive peaking network and the effects of variations in parasitic capacitance on the bandwidth.

FIG. 3A illustrates the bandwidth response of the circuit 100 without the inductive peaking network as compared to the circuit 100 with the inductive peaking network at varying termination parasitic capacitance $C_T$ 107. Without the inductive peaking network, the bandwidth response of the circuit 100 drops off to 75% at about $2 \times 10^9$ Hz. The introduction of the shunt inductor $L_{SH}$ 103 shifts the same drop off point out to about $2 \times 10^{10}$ Hz, and hence extends the bandwidth of the circuit 100. However, as the termination parasitic capacitance $C_T$ 107 is increased from 150 fF to 300 fF, the bandwidth shows a significant dip at $6 \times 10^9$ Hz. This dip can be attributed to the shifting of the zero pole associated with the termination parasitic capacitance $C_T$ 107 towards a lower frequency as the parasitic capacitance value is further increased.

Figure 3B:
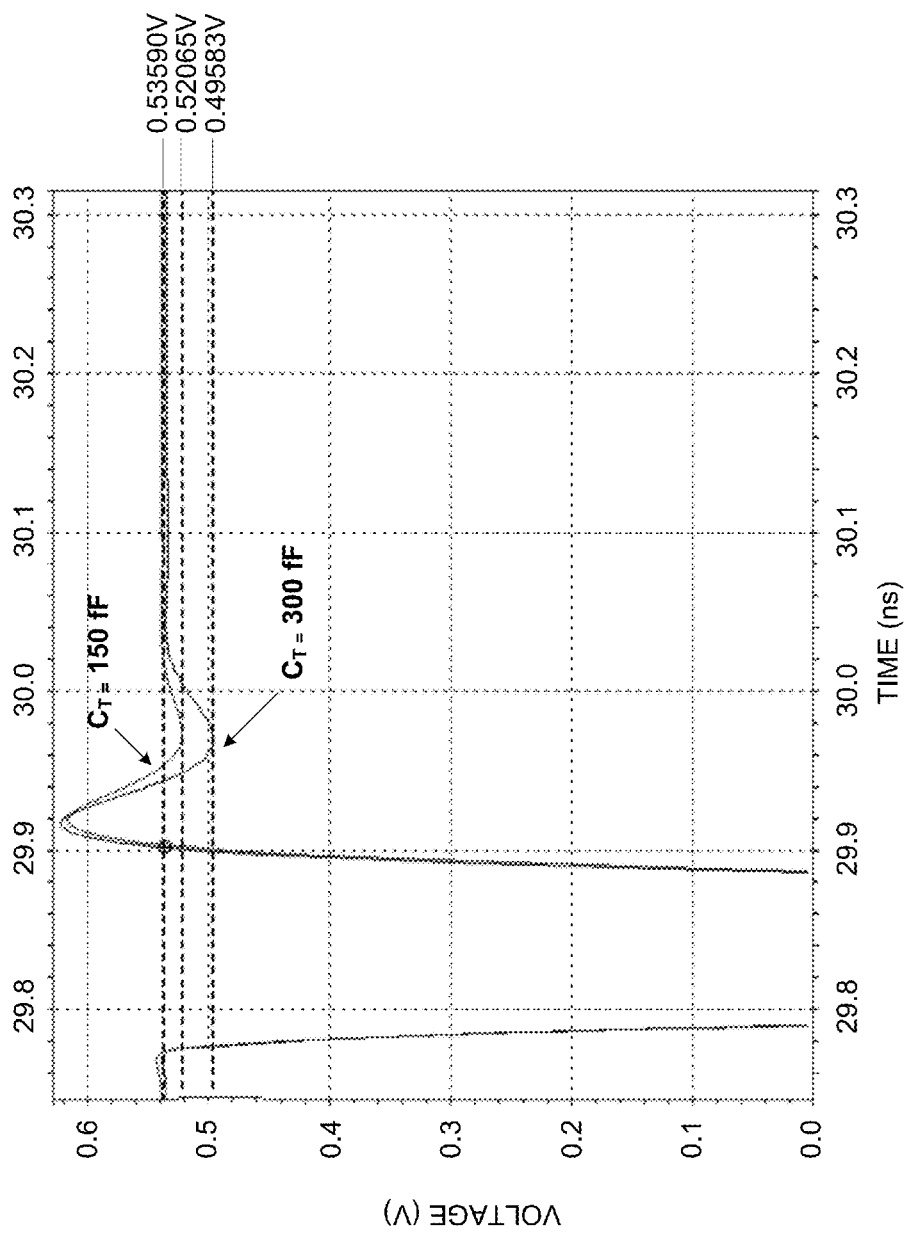
FIG. 3B illustrates the effects of variations in parasitic capacitance on the transient response of circuit with an inductive peaking network.

To illustrate the effects of the termination parasitic capacitance $C_T$ 107 further, FIG. 3B shows the transient response of the circuit 100 with the inductive peaking network. As illustrated, the transient response of the circuit 100 with a termination parasitic capacitance $C_T$ 107 of 300 fF shows a larger magnitude of ringing as compared to a termination parasitic capacitance $C_T$ 107 of 150 fF. Furthermore, the transient response of the circuit 100 with a termination parasitic capacitance $C_T$ 107 of 300 fF also shows a longer settling as compared to a termination parasitic capacitance $C_T$ 107 of 150 fF. Thus, while increasing the parasitic termination capacitance of a termination circuit may increase the BWXF of the circuit, further increases in the parasitic termination capacitance may degrade the signal integrity of the circuit.

Figure 4:
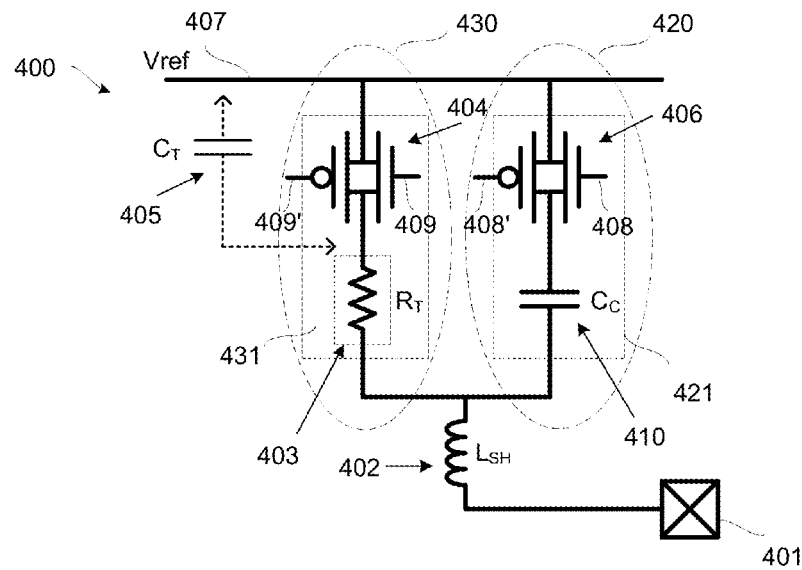
FIG. 4 illustrates capacitive tuning in a programmable termination resistance circuit for bandwidth extension according to some embodiments.

FIG. 4 illustrates capacitive tuning in a programmable termination resistance circuit 400 for bandwidth extension according to an embodiment. While the figure as illustrated shows a circuit for only one IO cell, it should be understood that the embodiment may be applied to some or all of the IOs within an integrated circuit device. It should also be understood that while the figure as illustrated shows a single-ended IO cell, the embodiment may be practiced with other IO signal types such as differential signal pairs. Furthermore, using capacitive tuning to compensate for parasitic is not limited to IO circuits but is also applicable to other applications where parasitic capacitance control is critical for circuit performance, for example, where changes in parasitic capacitance shifts pole locations and may alter signal adaptation of the application circuit. These other applications include, but are not limited to, circuits with inductive peaking networks, circuits for external calibration of reference resistor for termination resistance control, and Continuous Time Linear Equalizer (CTLE) circuits.

The integrated circuit device 400 according to some embodiments includes an IO pad 401 coupled to a programmable termination capacitance circuit 420. The programmable termination capacitance circuit 420 has at least one compensation bank 421 (only one bank is shown), with each compensation bank 421 having a compensation capacitor 410 coupled to a termination voltage or reference voltage 407 through a compensation pass gate 406. The integrated circuit device 400 also includes a programmable termination resistance circuit 430 coupled to the IO pad 401. The programmable termination resistance circuit 430 has at least one termination bank 431 (only one bank is shown), with each termination bank 431 having a termination resistance element 403 coupled to the reference voltage 407 through a termination pass gate 404. While the compensation pass gate 406 and termination pass gate 404 are shown as transmission gates, in other embodiments, the compensation pass gate 406 and termination pass gate 404 may be implemented as NMOS transistors, PMOS transistors, or other switch circuits known in the art.

The integrated circuit device 400 also includes an inductor 402 coupled between the programmable termination resistance circuit 430 and the IO pad 401. In the integrated circuit device 400, the inductor 402 is coupled in series with the programmable termination resistance circuit 430 and acts as a shunt inductor to form a shunt peaking network. Hence, the addition of the inductor 402 extends the bandwidth response of the IO cell by employing the inductive peaking technique as discussed above. It should be understood that the embodiment may be practiced with other arrangements of the inductor 402 to form other peaking networks, for example, series peaking networks to extend the bandwidth of the IO cell.

The programmable termination resistance circuit 430 may be configured to terminate the IO pad 401 with a termination resistance value $R_T$ by turning on the termination pass gate 404 by asserting the gate signal 409 to connect the termination resistance element 403 to the termination reference voltage 407. Note that gate signal 409' is the inverted version of the gate signal 409. The termination resistance element 403 may also be removed from the termination of the IO pad 401 by deasserting the gate signal 409 to disconnect the termination resistance element 403 from the termination reference voltage Vref 407. Although the termination resistance element 403 is shown as a single resistor, in other embodiments, the termination resistance element 403 may include any arrangement of resistive elements or other resistive networks and may also include other components such as other transistor networks.

In the programmable termination resistance circuit 430, the major contributor of parasitic capacitance is attributed to the termination pass gate 404. When the termination pass gate 404 is closed or switched on to connect the termination resistance element 403 to IO pad 401, the termination parasitic capacitance 405 is shorted. However, when the termination pass gate 404 is open, a termination parasitic capacitance $C_T$ of the termination pass gate 404 is introduced into the IO cell. This variation in the termination parasitic capacitance due to a programming choice of the programmable termination resistance circuit 430 may be sufficient to cause signal integrity degradation such as excessive ringing and longer settling time as previously discussed.

In some embodiments, the programmable termination capacitance circuit 420 is used to counter this variation in the termination parasitic capacitance. In some embodiments, the compensation capacitor 410 is chosen to have a capacitance value $C_C$ that is substantially equal to the parasitic capacitance value $C_T$. When the termination pass gate 404 is closed, the parasitic capacitance value $C_T$ is shorted. Ordinarily, the overall termination parasitic capacitance of the termination circuit is changed by an amount substantially equal to the contribution attributed to $C_T$. However, when the termination pass gate 404 is closed, the compensation pass gate 406 is closed as well by asserting the gate signal 408 in accordance with some embodiments. Note that gate signal 408' is the inverted version of the gate signal 408. The effect of closing the compensation pass gate 406 is to add a capacitance of $C_C$=$C_T$ back into the termination circuit. In such a manner, the overall termination parasitic capacitance of the termination circuit is held approximately constant regardless of the programming choice of the programmable termination resistance circuit 430, and hence the effects of variations in the termination parasitic capacitance due to the different programming choice of the programmable termination resistance circuit 430 can be controlled. As used in this specification, the term "substantially equal" or any of other similar terms (e.g., "substantially the same") may refer to two values that do not differ by more than 100%, and more preferably, that do not differ by more than 50%, and even more preferably, that do not differ by more than 20%. In other embodiments, the term "substantially equal" or any of other similar terms (e.g., "substantially the same") may refer to a resolution of a 1-bit code.

In alternative embodiments, the programmable termination capacitance circuit 420 may have an array of compensation banks, and the programmable termination resistance circuit 430 may have an array of termination banks. In further embodiments, each of the termination bank 431 in the array of termination banks may have a corresponding compensation bank 421 in the array of compensation banks. For example, if an array of termination banks has five termination banks, then the array of compensation banks may have at least five compensation banks such that each termination bank may be paired up with one compensation bank. This allows the parasitic capacitance of each one of the termination banks in the array to be compensated by at least one of the compensation banks in the array of compensation banks, independently of the other banks. In other embodiments, the array of termination banks may have any number n of termination banks, and the array of compensation banks may have any number m of compensation banks, where n and m are different. Moreover, in some embodiments, each of the compensation capacitor 410 may have a capacitance value that is different than the parasitic capacitance of the termination pass gate 404. In such embodiments, each of the termination pass gate 404 and the compensation pass gate 406 may be independently configured such that any amount of termination resistance within the range of the programmable termination resistance circuit 430 can be added to or removed from the circuit, and any amount of capacitance within the range of the programmable termination capacitance circuit 420 can be added to or removed from the circuit.

Figure 5:
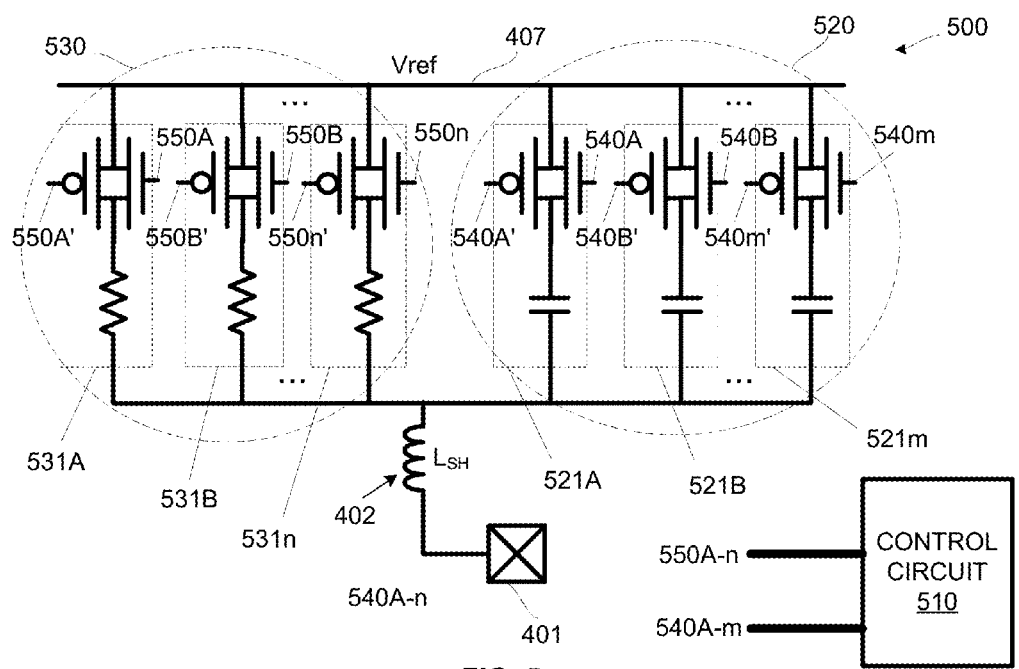
FIG. 5 illustrates an integrated circuit device with a n-bit programmable termination resistance circuit and a m-bit programmable termination capacitance circuit according to some other embodiments.

FIG. 5 illustrates an integrated circuit device 500 according to some further embodiments. The integrated circuit device 500 includes an IO pad 401, a programmable termination capacitance circuit 520 coupled between the IO pad 401 and a termination voltage or a reference voltage 407, and a programmable termination resistance circuit 530 coupled between the IO pad 401 and the reference voltage 407. The integrated circuit device 500 also includes a control circuit 510 coupled to the programmable termination capacitance circuit 520 through a termination capacitance control bus 540, and to the programmable termination resistance circuit 530 through a termination resistance control bus 550.

The programmable termination resistance circuit 530 includes a plurality of termination banks 531, with each termination bank having a termination resistance element coupled to the reference voltage 407 through a termination pass gate. Each of the termination pass gate is controlled by a corresponding gate signal 550. Note that the gate signal 550' is the inverted version of the corresponding gate signal 550. The programmable termination capacitance circuit 520 includes a plurality of compensation banks 521, with each compensation bank having a compensation capacitor coupled to the reference voltage 407 through a compensation pass gate. Each of the compensation pass gate is controlled by a corresponding gate signal 540. Note that the gate signal 540' is the inverted version of the corresponding gate signal 540. While the compensation pass gates and termination pass gates are shown as transmission gates, in other embodiments, the compensation pass gates and termination pass gates may be implemented as NMOS transistors, PMOS transistors, or other switch circuits known in the art.

In some embodiments, each of the termination banks in the programmable termination resistance circuit 530 has a corresponding compensation bank in the programmable termination capacitance circuit 520. For example, compensation bank 521A may correspond to termination bank 531A, compensation bank 521B may correspond to termination bank 531B, and so on. In other embodiments, the programmable termination resistance circuit 530 may have any number n of termination banks, and the programmable termination capacitance circuit 520 may have any number m of compensation banks, where n and m are different. While the programmable termination resistance circuit 530 and the programmable termination capacitance circuit 520 as illustrated show each of their respective banks arranged in parallel, in other embodiments, each of their respective banks may be arranged in other topographies to form other programmable resistive and capacitive circuit networks.

In some embodiments, the termination resistance control bus 550 includes one signal 550A-n for every termination pass gate in the programmable termination resistance circuit 530 such that each termination pass gate may be independently controlled. For example, in one exemplary embodiment, there may be n termination pass gates in n termination banks in the programmable termination resistance circuit 530. The termination resistance control bus 550 may include n independent signals to control each of the n termination pass gates. Hence, the termination resistance control bus 550 may be a n-bit bus.

In some embodiments, asserting each bit on the termination resistance control bus 550 may change the termination resistance of the circuit in increasing factors of two. For example, in an exemplary embodiment where n is five, if the termination resistance control bus 550 is set to 0x01 by the control circuit 510, the termination resistance of the circuit may increase or decrease by 3 Ohms nominal (1×). Setting the termination resistance control bus 550 to 0x02 may increase or decrease the termination resistance by 6 Ohms nominal (2×). Setting the termination resistance control bus 550 to 0x04 may increase or decrease the termination resistance by 12 Ohms nominal (4×). Other values may be set on the termination resistance control bus 550 to achieve intermediate values. For example, setting the termination resistance control bus 550 to 0x09 may increase or decrease the termination resistance by 9 Ohms nominal. In other embodiments, other resistance values independent for each of the termination banks may be used. In some embodiments, the programmable termination resistance circuit 530 may provide a termination resistance for the IO pad 401 in a range of 40 to 105 Ohms.

While the above example use nominal resistance values, these resistance values may vary from device to device due to different process corners, and may also vary in actual operation due to different operating conditions. For example, in one particular device, setting the termination resistance control bus 550 to 0x01 may increase or decrease the termination resistance by 2.25 Ohms (−25%) instead of 3 Ohms due to process variations. In another device, setting the termination resistance control bus 550 to 0x01 may increase or decrease the termination resistance by 3.75 Ohms (+25%) instead of 3 Ohms due to process variations.

Hence, in some embodiments, the integrated circuit device 500 includes a termination resistance calibration circuit coupled to the control circuit 510 such that the value set on the termination resistance control bus 550 may be determined by the termination resistance calibration circuit. The calibration circuit may be connected to other external circuits or measuring instruments external to the integrated circuit device 500 to calibrate the actual termination resistance of a particular device in accordance with some embodiments. For example, if design requirement requires the termination resistance of the integrated circuit device 500 to be set to 50 Ohms with a 2% tolerance, the calibration circuit may determine that for one particular device, the control circuit 510 should set the termination resistance control bus 550 to a value of 0x14 to close two termination pass gates in the programmable termination resistance circuit 530 to achieve a termination resistance of 50.1 Ohms for this device. For another particular device, the calibration circuit may determine that the control circuit 510 should set the termination resistance control bus 550 to a value of 0x1D to close four termination pass gates in the programmable termination resistance circuit 530 to achieve a termination resistance of 50.9 Ohms for that device.

As previously described, setting different values on the termination resistance control bus 550 may result in variations in the termination parasitic capacitance of the termination circuit. To compensate for this variation, each of the termination banks in the programmable termination resistance circuit 530 has a corresponding compensation bank in the programmable termination capacitance circuit 520. In some embodiments, each of the compensation capacitor in the programmable termination capacitance circuit 520 has a capacitance value that is substantially equal to the parasitic capacitance of its corresponding termination pass gate in the programmable termination resistance circuit 530. The control circuit 510 is also configured to program the value on the termination capacitance control bus 540 to be the same value as the termination resistance control bus 550. In some embodiments, each termination pass gate control signal may be connected directly with its corresponding compensation pass gate signal such that both gates can be controlled together. In other words, pass gate signal 550A can be coupled directly to pass gate signal 540A, pass gate signal 550B can be coupled directly to pass gate signal 540B, and so on. For example, if the termination resistance control bus 550 is set to 0x14 as determined by the calibration circuit, then the control circuit 510 also sets the termination capacitance control bus 550 is to 0x14. Hence, while the programming of the programmable termination resistance circuit 530 reduces the parasitic capacitance of the circuit by 2× the parasitic capacitance of the terminating pass gate, substantially the same amount of compensation capacitance is added back into the circuit to keep the overall parasitic capacitance of the termination circuit approximately constant. As a result, the parasitic capacitance of the termination circuit may be kept constant independent of process and operating corners.

In alternative embodiments, the termination resistance element in each of the termination banks 531 may include any arrangement of resistive elements or other resistive networks and may also include other components such as other transistor networks. Moreover, each of the compensation capacitor in each of the compensation banks 521 may have a capacitance value that is different than the parasitic capacitance of its corresponding termination pass gate in the termination bank 531. In some further embodiments, each of the termination pass gate and the compensation pass gate may be independently configured by the control circuit 510 such that any amount of termination resistance within the range of the programmable termination resistance circuit 530 can be added to or removed from the circuit, and any amount of capacitance within the range of the programmable termination capacitance circuit 520 can be added to or removed from the circuit. Furthermore, in other embodiments, the programmable termination resistance circuit 530 may include n number of termination banks 531A-n, while the programmable termination capacitance circuit 520 may include m number of compensation banks 521A-m, where n is a different number than m. In these embodiments, the termination resistance control bus 550 may be n-bit wide, and the termination capacitance control bus 540 may be m-bit wide.

Figure 6:
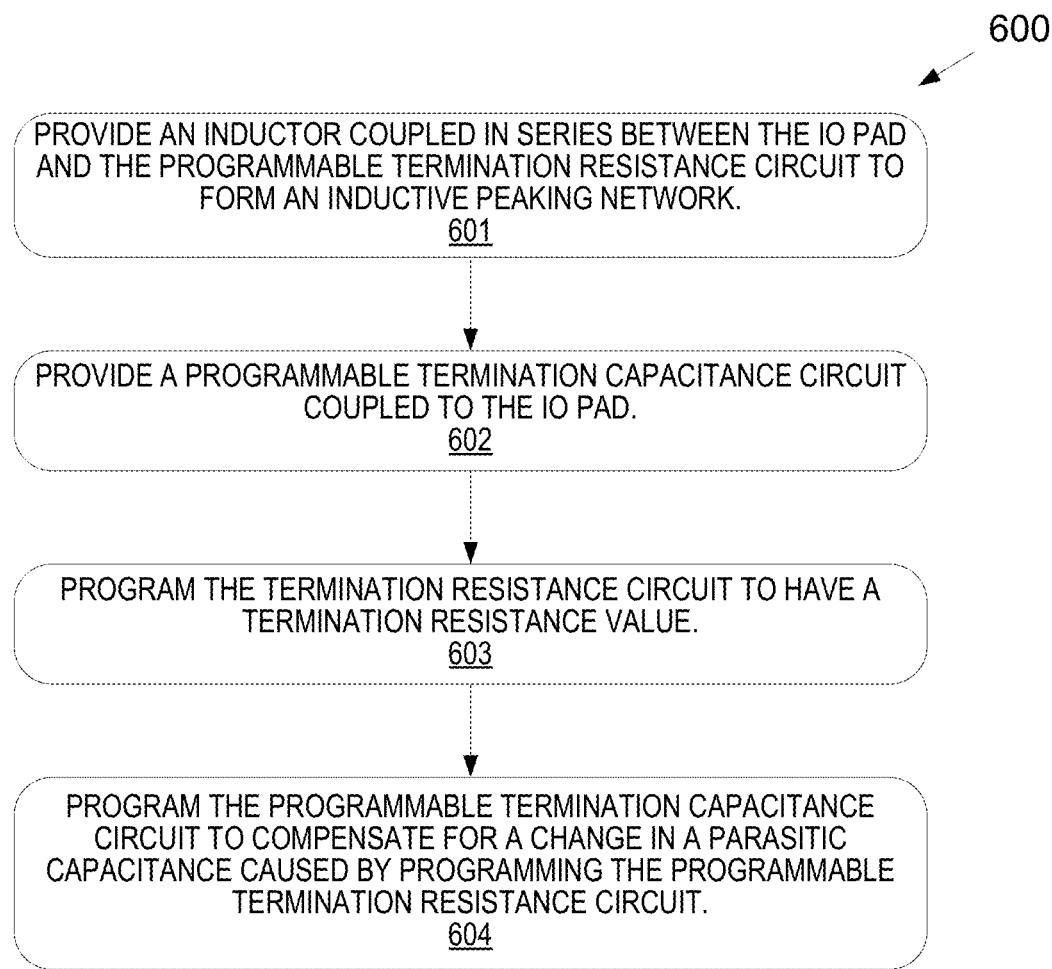
FIG. 6 illustrates a method of maximizing bandwidth extension for an input/output (IO) pad in accordance with some embodiments.

FIG. 6 illustrates a method of maximizing bandwidth extension for an input/output (IO) pad in accordance with some embodiments. In block 601, an inductor coupled in series between an IO pad and a programmable termination resistance circuit is provided to form an inductive peaking network. In block 602, a programmable termination capacitance circuit coupled to the IO pad is provided. In block 603, the programmable termination resistance circuit is programmed to have a termination resistance value. The programmable termination resistance circuit may be programmed based on a result of a calibration of the programmable termination resistance circuit to achieve a particular termination resistance within a certain tolerance range as required by a specific design application. In block 604, the programmable termination capacitance circuit is programmed to compensate for a change in a parasitic capacitance caused by programming the programmable termination resistance circuit. The programmable termination capacitance circuit may be programmed to compensate a capacitance value substantially equal to the change in the parasitic capacitance caused by programming the programmable termination resistance circuit. In other embodiments, the programmable termination resistance circuit may be programmed independently of the programmable termination capacitance circuit.

As illustrated in the above embodiments, providing a programmable termination capacitance circuit to an IO cell as described is advantageous because it allows the parasitic termination capacitance of termination circuit of the IO cell to be kept constant independent of process and operating corners. Furthermore, by providing a programmable termination capacitance circuit to an IO cell, the signal integrity performance of an IO cell may also be independently adjusted to tailor the IO cell to a particular design application.

Although particular embodiments have been shown and described, it will be understood that they are not intended to limit the claimed invention, and it will be obvious to those skilled in the art that various changes and modifications may be made without departing from the spirit and scope of the present invention. The specification and drawings are, accordingly, to be regarded in an illustrative rather than restrictive sense. The claimed invention is intended to cover alternatives, modifications, and equivalents.

What is claimed is:

1. An integrated circuit device, comprising:
an input/output (IO) pad;
a programmable termination capacitance circuit coupled to the IO pad, the programmable termination capacitance circuit comprising at least one compensation bank, wherein each of the at least one compensation bank includes a compensation capacitor coupled to a reference voltage through a compensation pass gate; and
a programmable termination resistance circuit coupled to the IO pad, the programmable termination resistance circuit comprises at least one termination bank, wherein each of the at least one termination bank comprises a termination resistance element coupled to the reference voltage through a termination pass gate.

2. The integrated circuit device of claim 1, further comprising an inductor coupled between the programmable termination resistance circuit and the IO pad to form an inductive peaking network.

3. The integrated circuit device of claim 1, wherein the at least one compensation bank comprises an array of compensation banks.

4. The integrated circuit device of claim 1, wherein the programmable termination resistance circuit comprises an array of termination banks.

5. The integrated circuit device of claim 4, wherein the at least one compensation bank comprises an array of compensation banks, and wherein each of the termination banks in the array of termination banks has a corresponding compensation bank in the array of compensation banks.

6. The integrated circuit device of claim 5, wherein for each of the termination banks and the corresponding compensation bank, the compensation capacitor in the compensation bank has a capacitance value substantially equal to a parasitic capacitance value of the termination pass gate in the corresponding termination bank.

7. The integrated circuit device of claim 6, wherein for each of the termination banks and the corresponding compensation bank, a first gate terminal of the compensation pass gate in the compensation bank is coupled to a second gate terminal of the termination pass gate in the corresponding termination bank.

8. An integrated circuit device, comprising:
an input/output (IO) pad;
a programmable termination capacitance circuit coupled between the IO pad and a reference voltage;
a programmable termination resistance circuit coupled between the IO pad and the reference voltage; and
a control circuit coupled to the programmable termination capacitance circuit through a termination capacitance control bus, and to the programmable termination resistance circuit through a termination resistance control bus.

9. The integrated circuit device of claim 8, wherein the programmable termination capacitance circuit comprises a plurality of compensation banks, wherein each of the compensation banks comprises a compensation capacitor coupled to the reference voltage through a compensation pass gate.

10. The integrated circuit device of claim 8, wherein the programmable termination resistance circuit comprises a plurality of termination banks, wherein each of the termination banks comprises a termination resistance element coupled to the reference voltage through a termination pass gate.

11. The integrated circuit device of claim 10, wherein each of the termination banks in the programmable termination resistance circuit has a corresponding compensation bank in the programmable termination capacitance circuit.

12. The integrated circuit device of claim 11, wherein for each of the termination banks and the corresponding compensation bank, the compensation capacitor in the compensation bank has a capacitance value substantially equal to a parasitic capacitance value of the termination pass gate in the termination bank.

13. The integrated circuit device of claim 12, wherein the termination resistance control bus comprises a plurality of termination resistance control signals each individually controlling one of the termination pass gates, and the termination capacitance control bus comprises a plurality of termination capacitance control signals each individually controlling one of the compensation pass gates.

14. The integrated circuit device of claim 13, wherein the control circuit is configured to program a value on the termination capacitance control bus to be the same as a value on the termination resistance control bus.

15. The integrated circuit device of claim 14, wherein the value on the termination resistance control bus is determined by a termination resistance calibration circuit.

16. The integrated circuit device of claim 13, wherein the control circuit is configured to set a value on the termination capacitance control bus independent of a value on the termination resistance control bus.

17. A method of maximizing bandwidth extension for an input/output (IO) pad having a programmable termination resistance circuit, the method comprising:
providing an inductor coupled in series between the IO pad and the programmable termination resistance circuit to form an inductive peaking network;
providing a programmable termination capacitance circuit coupled to the IO pad;
programming the programmable termination resistance circuit to have a termination resistance value; and
programming the programmable termination capacitance circuit to compensate for a change in a parasitic capacitance caused by programming the programmable termination resistance circuit.

18. The method of claim 17, wherein the programmable termination resistance circuit is programmed based at least in part on a result of a calibration of the programmable termination resistance circuit.

19. The method of claim 17, wherein the programmable termination capacitance circuit is programmed to compensate a capacitance value substantially equal to the change in the parasitic capacitance caused by programming the programmable termination resistance circuit.

* * * * *